(12) United States Patent
Castiglioni

(10) Patent No.: US 9,182,043 B2
(45) Date of Patent: Nov. 10, 2015

(54) VALVE DEVICE FOR HIGH VOLTAGE CABLE INSULATOR MANUFACTURING

(75) Inventor: Walter Castiglioni, Milan (IT)

(73) Assignee: PRYSMIAN S.P.A., Milan (IT)

( * ) Notice: Subject to any disclaimer, the term of this patent is extended or adjusted under 35 U.S.C. 154(b) by 111 days.

(21) Appl. No.: 13/990,993

(22) PCT Filed: Dec. 1, 2010

(86) PCT No.: PCT/EP2010/068633
§ 371 (c)(1),
(2), (4) Date: Aug. 20, 2013

(87) PCT Pub. No.: WO2012/072128
PCT Pub. Date: Jun. 7, 2012

(65) Prior Publication Data
US 2013/0327267 A1    Dec. 12, 2013

(51) Int. Cl.
| | |
|---|---|
| *B05C 3/02* | (2006.01) |
| *B05B 7/00* | (2006.01) |
| *F16K 5/08* | (2006.01) |
| *F16K 11/072* | (2006.01) |
| *F16K 3/30* | (2006.01) |
| *F16K 11/083* | (2006.01) |
| *B65D 83/06* | (2006.01) |

(52) U.S. Cl.
CPC . *F16K 3/30* (2013.01); *B65D 83/06* (2013.01); *F16K 11/072* (2013.01); *F16K 11/083* (2013.01)

(58) Field of Classification Search
USPC ......... 118/400, 410, 308, 303, 302, 404, 405, 118/419, 429; 137/240, 241, 874, 625.47
See application file for complete search history.

(56) References Cited

U.S. PATENT DOCUMENTS

| | | | |
|---|---|---|---|
| 1,504,498 A | 8/1924 | Petcher | |
| 3,774,890 A * | 11/1973 | Lemelson | 425/3 |

(Continued)

FOREIGN PATENT DOCUMENTS

| | | |
|---|---|---|
| CN | 2699081 Y | 5/2005 |
| FR | 2 294 370 | 7/1976 |

(Continued)

OTHER PUBLICATIONS

Notification of the First Office Action with English language translation issued by State Intellectual Property Office of the People's Republic of China on May 9, 2014, in corresponding Chinese Application No. 201080070431.5.

(Continued)

*Primary Examiner* — Yewebdar Tadesse
(74) *Attorney, Agent, or Firm* — Finnegan, Henderson, Farabow, Garrett & Dunner, L.L.P.

(57) ABSTRACT

A valve device for use in a feeding apparatus releases raw material into raw material processing machinery for the manufacture of high-voltage cable. The valve device includes a valve body including a first valve member having a conical shape and including at least one opening extending between a tip of the first valve member and a corresponding base portion of the first valve member, and a second valve member including at least one cover element. One of the valve members is rotatable with respect to the other valve member between a first operating position in which the at least one cover element uncovers the at least one opening, thereby allowing the raw material to flow through the valve device, and a second operating position in which the at least one cover element covers the at least one opening, thereby preventing raw material from flowing through the valve device.

9 Claims, 4 Drawing Sheets

(56) References Cited

U.S. PATENT DOCUMENTS

| 3,874,825 | A | 4/1975 | Jentsch |
| 4,372,337 | A | 2/1983 | Holzenberger |
| 6,155,298 | A | 12/2000 | Aigami |
| 2003/0159658 | A1 | 8/2003 | Adams |

FOREIGN PATENT DOCUMENTS

| GB | 1 504 000 | 3/1978 |
| WO | WO 2009/076375 A1 | 6/2009 |

OTHER PUBLICATIONS

International Search Report from the European Patent Office for International Application No. PCT/EP2010/068633, mailing date Sep. 26, 2011.

Written Opinion of the International Searching Authority from the European Patent Office for International Application No. PCT/EP2010/068633, mailing date Sep. 26, 2011.

Official Action with English language translation issued by the Russian Patent Office on Oct. 13, 2014, in counterpart Russian Application No. 2013129817/05(044341).

* cited by examiner

VALVE DEVICE FOR HIGH VOLTAGE CABLE INSULATOR MANUFACTURING

CROSS REFERENCE TO RELATED APPLICATION

This application is a national phase application based on PCT/EP2010/068633, filed Dec. 1, 2010, the content of which is incorporated herein by reference.

BACKGROUND OF THE INVENTION

1. Field of the Invention

The present invention generally relates to the field of high voltage cables manufacturing. More specifically, the present invention relates to a valve device particularly adapted to be used in feeding apparatuses for dispensing products, such as for example polymer compound granules, to an extruder machinery carrying out high voltage cables insulation.

2. Overview of the Related Art

Cable manufacturing, and in particular the manufacturing of high voltage cables—such as, for example, high voltage electric power distribution cables operating at voltages in the range from 20 up to 500 kV—typically requires that a central conductor of the cable is completely covered by a coating of homogenous insulating material, referred to as cable insulator in the following, able to electrically insulate the central conductor and prevent any possible dangerous electric discharge towards the surrounding environment.

As known in the art, during the manufacturing of a high voltage cable, the step of covering the central conductor with the cable insulator is achieved by an extrusion process of polymer compounds substantially including raw thermoplastic materials in the form of pellets (generally known as "granules"), which extrusion process allows creating a coating of a substantially constant and predetermined cross-sectional profile through a machinery called extruder. In particular, the granules of thermoplastic material, which are to be fed to the extruder, are loaded, stored and transported within a bin (generally an octabin,—i.e., a prism-shaped bin having an octagon base); in order to feed the extruder, the octabin is placed over an extruder load hopper, which connects the octabin and the extruder and through which the granules of thermoplastic material are caused to flow by gravity. When the granules enter the extruder and come into frictional contact with an extruder rotating screw (normally rotating at up to 120 rpm), the granules of thermoplastic material are heated up (for example at temperatures from 200° C. up to 275° C.) and melt, and the melted polymer is then pushed through an extruder die having a desired cross-section, and finally properly cooled.

As known to those skilled in the art, it is of the utmost importance that the cable insulator is, as far as possible, free from contaminants, so as to be able to ensure an effective insulation of the high voltage cable. In fact, the presence of contaminants in the cable insulator causes defects which may cause, in relative short periods of use, a drastic increase of local electrical fields acting thereon in response to applied high voltage gradients; such condition typically accelerates the ageing of the cable insulator and reduces an insulation breakdown strength of the same, thus making the high voltage cables unreliable. To this end, the raw material used to form the cable insulator, i.e. the granules of thermoplastic materials fed to the extruder, shall have a very high degree of "cleanliness". When the octabin is located above the extruder load hopper, the risk that contaminant particles or foreign bodies spuriously enter into the load hopper is relatively low, since the octabin substantially covers the extruder load hopper, whereas such risk becomes significant when the octabin is positioned away from the extruder load hopper and the latter is left uncovered; this actually happens relatively frequently, when, for example, the octabin has to be removed because for example empty, and replaced by a new octabin.

Therefore, although the above described method used for feeding or discharging the granules of thermoplastic material from the octabin to the extruder during cable insulator manufacturing is widely practiced thanks to the simplicity thereof, the fact that it is not possible to effectively prevent contaminating particles coming from the surrounding environment from entering the extruder when the octabin is not above the extruder load hopper makes the cable insulator (and hence the whole cable) very instable in terms of electrical and mechanical performance, thus resulting in a reduced reliability and lifetime of the cable.

Some manual expedients could in principle be adopted to prevent the input of contaminating particles into the extruder load hopper; for example, it could be possible to provide a cap for the extruder load hopper which is manually put thereon to close its entrance when the octabin is not in place, and manually removed after the octabin has been positioned so as to allow the granules of thermoplastic material to fall into the load hopper. However, such a solution is not very effective, since it involves a further manual operation to be performed by the personnel during the cable manufacturing process, thus being burdensome for an operator who has to be extremely careful during accomplishing the putting and the removing operations. Moreover, the manual cap placement and removal is an operation prone to errors, being inevitably subject to human mistakes that may impair the overall cable insulator manufacturing process, thereby causing time wastes and/or economic losses. Last but not least, the manual cap placement and removal may cause injuries to the operator.

For example, WO2009076375A1 discloses a dispensing system for granular materials, in particular agricultural products, capable of dispensing multiple products in different receptacles through a rotating structure. The rotating structure disclosed in such documents, although acting as a rotating valve for selectively distributing granular materials into corresponding receptacles, does not avoid possible feeding of undesired contaminating particles or materials in the receptacles. In particular, if undesired materials reach the dispenser, the latter keeps on supplying the contaminated granular materials without any supplying stop mechanism. Moreover, the dispenser configuration allows switching the material in different receptacles, but it does not allow discharging waste products outwards; in fact, since no discharge means are provided, which could throw away the contaminated granular material, such dispenser configuration is not adapted to be used for the purpose of the present invention, i.e., for feeding the extruder load hopper (and hence the extruder) during high voltage cable manufacturing.

US2003/159658 relates to a product discharge mechanism for a hopper having a gate or valve slideably positioned such that in one position it covers a fixed discharge opening of the hopper thereby obstructing product flow, and in one or more other positions it is at least partially opened with respect to the discharge opening so that said product may flow through the fixed opening and thereby be discharged from the hopper. In other words, with the mechanism disclosed in such document, no product can flow when the valve is in the closed position, but when the plate is away from the fixed openings, product can flow.

Therefore, the valve disclosed in such document, although regulating the product flow, is not able to prevent any product contamination by contaminating particles inevitably coming from the external environmental, i.e., the drawback of feeding waste materials into the hopper persists. Moreover, no lateral discharge passageways are provided for the product discharge mechanism so as to switch the undesired material to the external.

SUMMARY OF THE INVENTION

In view of the foregoing, the Applicant has tackled the problem of devising a solution suitable to ensure that essentially no contaminants are mixed with the raw material to be extruded for forming a cable insulator, especially in the case of high-voltage cable.

The Applicant found that by associating to the extruder load hopper a valve device operable to selectively open or close the flow into the load hopper of material, it is possible to positively prevent any mixing of the raw material granules and any contaminant agent, especially when the bin is not positioned above the extruder load hopper.

The solution according to the present invention relates to a valve device, suitable for use in a feeding apparatus releasing raw material into a raw material processing machinery for the manufacturing of a high voltage cable, including a valve body which comprises a first valve member having a conical shape and at least one opening extending between a tip of the first valve member and a corresponding base portion of the first valve member, and a second valve member including at least one cover element; one of said first valve member and second valve member is rotatable with respect to the other valve member between a first operating position, in which the at least one cover element uncovers the at least one opening thereby allowing the raw material to flow through the valve device, and a second operating position, in which the at least one cover element covers the at least one opening thereby preventing the raw material from flowing through the valve device.

Preferably, the second valve member is rotatable with respect to the first valve member about a vertical rotation axis substantially corresponding to an axis of symmetry of the valve device.

Preferably at least one wall of the first valve member not opened by the at least one opening defines a corresponding discharge sliding wall; for example, the discharge sliding wall can be used for conducting contaminants outside the valve body in the second operating condition of the second valve member.

Optionally, the valve body includes a valve body outer case for laterally surrounding the first and second valve members. Said valve body outer case usefully includes at least one discharging window. Each discharge window can be properly coupled to a corresponding discharge sliding wall for discharging the contaminants from the discharge sliding wall outside the valve body of the valve device.

The cover element of the second valve member is preferably a wedge-shaped element. In this way, the wedge-shaped element may be particularly adapted to cause, in the second operating position of the second valve member, contaminants falling thereon to slide towards the discharge sliding walls (and hence outside the valve body through the discharge windows), and to cover, in the first operating position of the second valve member, a corresponding one of the at least one discharge window of the valve body outer case.

Preferably the valve body outer case has a substantially cylindrical shape. Advantageously, the valve body outer case comprises a top flange and a bottom flange; the bottom flange is usefully adapted to receive thereon the contaminants from the at last one discharge window.

The valve device preferably includes a hollow cylindrical cover for enclosing at least the bottom flange in order to prevent contaminants coming out from the at least discharge window or deposited along the bottom flange from dispersing into the surrounding environment. Said cover is preferably configured to be vertically movable from a rest position resting on the bottom flange to a vertical lifted-up position. The vertical lifted-up position is such as to allow accessing to the bottom flange for cleaning operation thereof.

The valve device preferably includes a connecting conduit. The conduit is connectable between a bin releasing raw material and the top flange of valve body outer case. In this way, said connecting conduit can allow the releasing operation of the raw material by the bin without substantial raw material losses.

In a preferred embodiment, the valve device includes a cogwheel coupled to the second valve member for causing the rotation thereof. The cogwheel is preferably caused to rotate by a suitable motor apparatus. The motor apparatus advantageously includes a pinion engaging the cogwheel.

Another aspect of the present invention relates to a feeding apparatus for high voltage cable manufacturing process suitable for releasing raw material into raw material processing machinery for high voltage cable manufacturing process, comprising a load hopper for feeding raw material coming from a raw material bin into the raw material processing machinery and at least one of said valve device.

A further aspect of the present invention relates to an extrusion apparatus including an extruder for extruding raw material around a high-voltage cable core and an extruder feeding apparatus for feeding the raw material to be extruded from a raw material bin into the extruder through an extruder load hopper, the extrusion apparatus further comprising at least one of said valve device.

Thanks to the present invention, it is possible to provide an improved dispensing or feeding apparatus for effectively feeding raw materials (such as granules of thermoplastic material for high voltage cable manufacturing) having high cleanliness, i.e., raw materials that are substantially free of contaminant agents like for example waste materials coming from the surrounding environment. Therefore, the high cleanliness of the raw material that is fed to the extruder makes the cable insulator (and hence the whole high voltage cable) very stable in terms of electrical and mechanical performance, thus resulting in an improved reliability and lifetime of the high voltage cable itself. Moreover, such solution turns out to be very effective, since it does not involve any burdensome or delicate additional operation to be performed manually by the operator during the cable manufacturing process, thus resulting in a highly effective and precise opening and closing of the valve device and in a considerable time and/or economic saving which directly translate into an improved of the efficiency of the overall high voltage cable manufacturing process.

BRIEF DESCRIPTION OF THE ANNEXED DRAWINGS

These and other features and advantages of the present invention will be made apparent by the following description of some exemplary and non limitative embodiments thereof; for its better intelligibility, the following description should be read making reference to the attached drawings, wherein:

FIG. 1 schematically shows an extruder with an extruder feeding apparatus according to the principles of the present invention;

DETAILED DESCRIPTION OF PREFERRED EMBODIMENTS OF THE INVENTION

Figure 1:
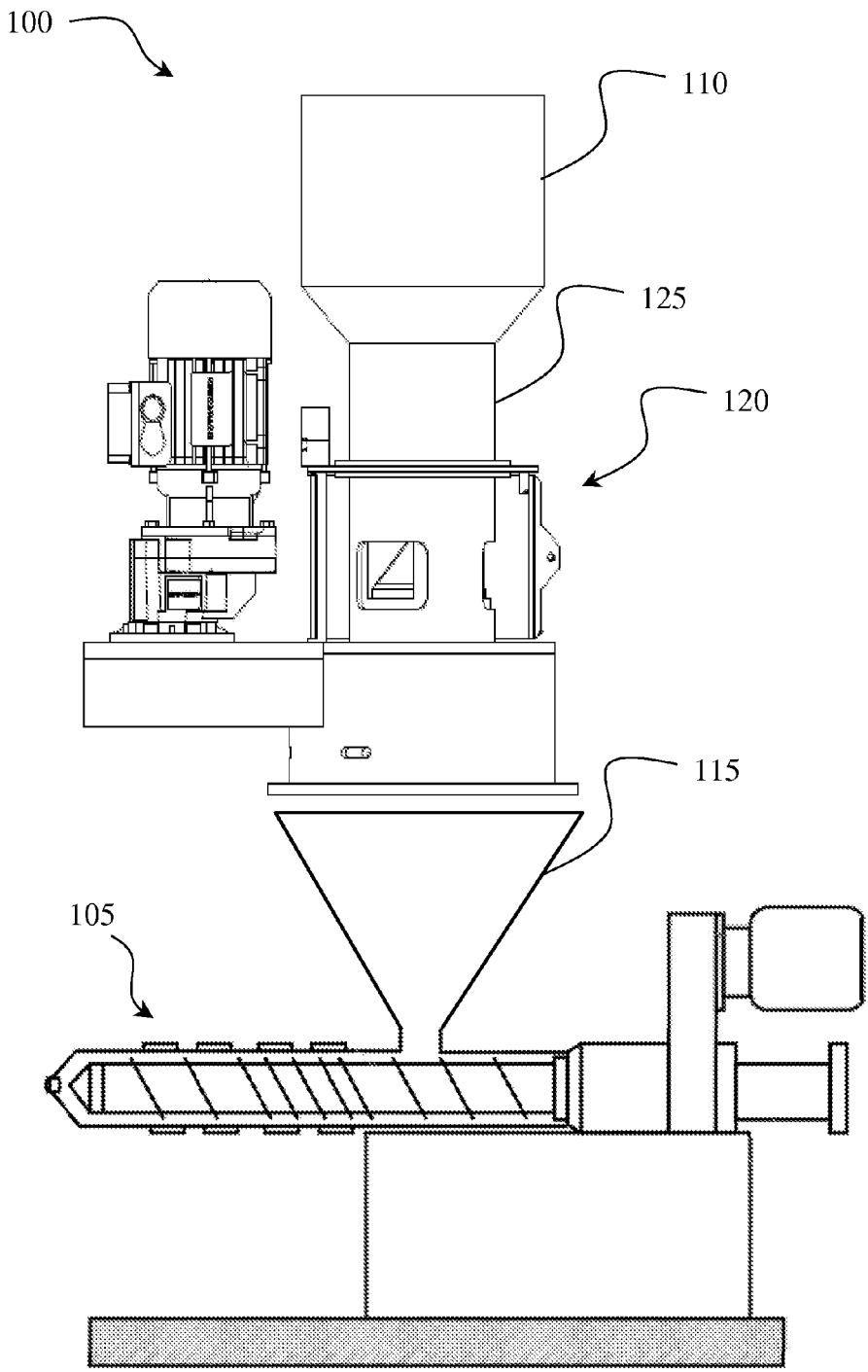

With reference to the drawings, and particularly to FIG. 1, the latter schematically shows an extrusion apparatus according to an embodiment of the present invention, specifically designed for forming a cable insulator, especially for high-voltage cable.

The extrusion apparatus comprises an extruder feeding apparatus 100 for feeding raw materials to be extruded into an extruder 105; more particularly, in the considered scenario, the feeding apparatus 100 is suitable for dispensing granules of thermoplastic material to the extruder 105, which, by extrusion, allows covering a central conductor (cable core) of the high voltage cable (not shown in the figure) with an insulating coating acting as cable insulator of the high voltage cable.

The extruder 105 is a machinery well known and widely used in the art, and for such reason it is only schematically depicted in the drawing. Essentially, the granules of thermoplastic material, once fed into the extruder 105, come into frictional contact with an extruder rotating screw, they are heated up to a melt temperature and consequently melted, and the melted plastic material is caused to pass through an extrusion die, shaped according to the desired cross-section, and thereafter applied to the high-voltage cable core, so as to completely cover it; finally, the insulating coating is properly cooled.

The feeding apparatus 100 for feeding the granules of thermoplastic material into the extruder 105 is adapted to receive the granules from a granules container, typically an octabin—i.e., a prism-shaped bin having an octagonal base—110, where the granules are stored for shipping and storage. The octabin 110 is removably accommodated in the feeding apparatus 100 over a, e.g. funnel-shaped, extruder load hopper 115, which is part of the feeding apparatus 100 and which has an outlet in communication with the extruder 105; in its general terms, the extruder load hopper 115, which is depicted in a schematic way in the figure for simplicity, is a component used for feeding the extruder 105 with the required raw material (granules of thermoplastic material, in the specific case here considered). In particular, the extruder load hopper 115 couples the octabin 110 and the extruder 105 in such a way that when the granules of thermoplastic material to be extruded are caused to flow by gravity into the extruder load hopper 115 from the octabin 110 positioned thereon, the funnel shape of the extruder load hopper 115 allows feeding the granules into the extruder 105 by routing or canalizing them in such a way to prevent spillage and raw material losses, and therefore avoiding granules wasting.

According to the present invention, the feeding apparatus 100 comprises a valve device 120 positioned between, and vertically aligned to, the extruder load hopper 115 and the octabin 110.

The valve device 120 is able to prevent dirty, waste materials, or more generally contaminants, from entering into the extruder load hopper 115, and thus into the extruder 105, a circumstance that should be avoided since it might impair the effective insulation provided by the cable insulator to the conductive cable core of the high voltage cable. In this respect, it should be noted that such undesired circumstance may frequently occur in the known feeding apparatus (in which the valve device is not provided) when the octabin 110 is in a position away from (i.e., not above) the extruder load hopper 115; this is a relatively recurrent situation that may happen, for example, when the octabin 110 empties and needs to be replaced by a new, full octabin for the cable manufacturing process to go on. In such condition, if the load hopper entrance is left free and uncovered, contaminants coming from the surrounding environment may easily fall within the extruder load hopper 115, and hence flow into the extruder 105, thereby causing defects in the insulating coating, which typically involve a relatively significant loss of quality and of insulating properties of the cable insulator.

In the same way, the valve device 120 is also able to prevent unwanted raw material from entering into the extruder 105, such as for example in case that the extruder 105 needs no more raw material to be fed through the extruder load hopper 115 but amounts of raw material escape from the octabin 110.

The valve device 120 construction is such as to implement substantially two different operating configurations, and particularly an opened configuration, allowing the granules of thermoplastic material released from the octabin 110 to enter into the extruder load hopper 115 from its entrance (and hence flow into the extruder 105), and a closed configuration, which essentially closes the load hopper entrance; advantageously, as will be better described in the following, in the closed configuration the valve device 120 is capable of diverting and draining contaminants (dirty particles and/or unwanted raw material) heading towards it (i.e., potentially heading towards the extruder load hopper 115 and the extruder 105) away from the entrance of the extruder load hopper 115, and thus it positively prevents any contaminant from entering into the extruder 105 even after the valve device 120 is brought again to the opened configuration.

As schematically shown in the figure, a connecting conduit 125 can be conveniently applied on top of the valve device 120 for connecting the octabin 110 and the valve device 120. In particular, the conduit 125 allows that, when the octabin 110 releases the granules of thermoplastic materials, the latter are confined within the conduit 125 and better guided towards the valve device 120, thereby avoiding granules losses.

Figure 2:
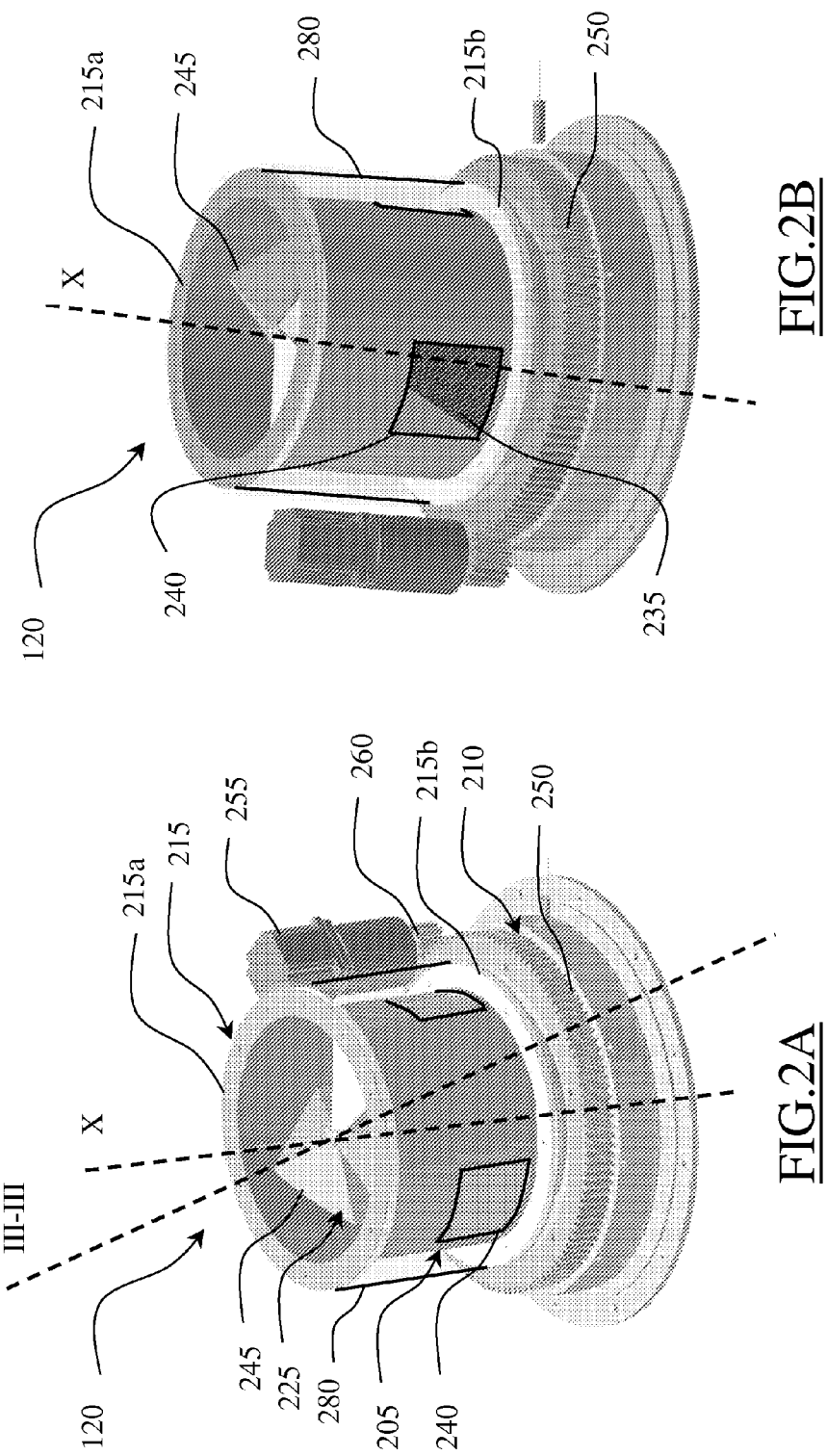
FIGS. 2A and 2B show, in perspective view, a valve device of the feeding apparatus of FIG. 1, according to an embodiment of the present invention, the valve device being depicted in two corresponding operating configurations (open in FIG. 2A and closed in FIG. 2B)

A more detailed view of the valve device 120 according to an embodiment of the present invention is shown in perspective view in FIG. 2A, depicting the valve device 120 in the opened configuration thereof, and in FIG. 2B, depicting the valve device 120 in the closed configuration thereof; as visible in such figures, the valve device 120 (depicted without the conduit 125 for simplicity) includes a valve body 205, and a valve base 210, which, as will be understood briefly, supports the valve body 205, coupling it to the inlet port of the extruder load hopper (not shown in such figures), and is provided with means for actuating the valve device 120 so as to selectively bring it into the opened and closed configurations.

Figure 3:
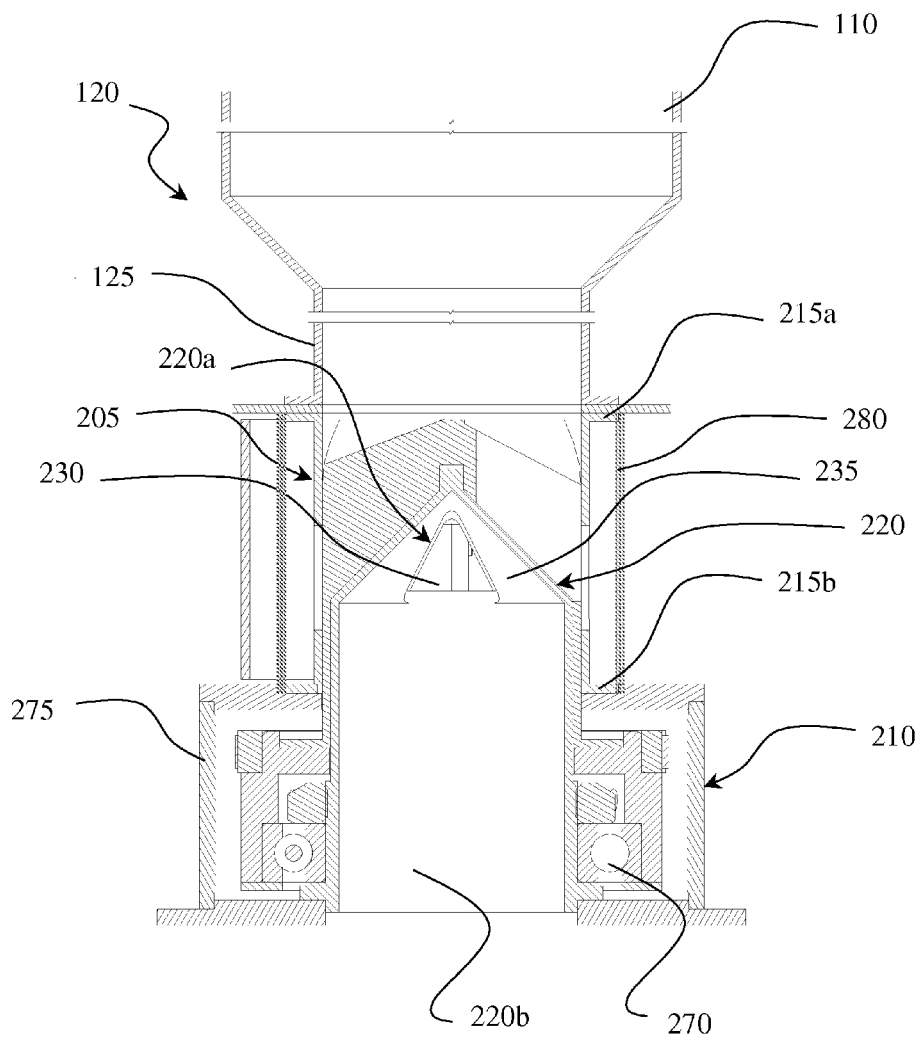
FIG. 3 shows in a cross-sectional view along the III-III axis of FIG. 2A the valve device according to an embodiment of the present invention, and FIGS. 4A and 4B schematically show a top view of the valve device of FIGS. 2A and 2B, respectively, in an open and closed operating conditions.

Referring jointly to FIGS. 2A-2B and FIG. 3, the latter showing a cross sectional view of the valve device 120 along the III-III axis of FIG. 2A and FIG. 2B, the valve body 205 includes a valve body outer casing 215 (for example, made of metal) having a substantially hollow cylindrical shape, with upper and lower flanges 215a and 215b, respectively for the mechanical coupling with the conduit 125 and with the underlying valve base 210. The valve body outer casing 215 is adapted to house a first valve member 220 of the valve body 205, and a second valve member 225 of the valve body 205. According to the present invention, one of the first valve member 220 and the second valve member 225 is rotatable with respect to the other valve member, i.e. the first valve member 220 and the second valve member 225 are configured such as to be reciprocally rotatable with respect to each other. In the exemplary but not limiting embodiment herein disclosed, the first valve member 220 is static, and therefore referred to as stator 220 hereinafter, whereas the second valve member 225 is rotatable, and therefore referred to as rotor 225 hereinafter, with respect to the stator 220 about a vertical rotation axis substantially corresponding to an axis of symmetry X of the valve device 120; as will be described shortly hereafter in greater detail, the proper angular rotation of the rotor 225 with respect to the stator 220 allows selectively bringing the valve device 120 into said opened and closed operating configurations.

In the exemplary but not limiting embodiment herein disclosed, the stator 220 comprises a substantially cone-shaped or frusto-conical portion 220a joined, below it, to a substantially cylindrical portion 220b, and is arranged within the valve body outer casing 215 in such a way that an axis of symmetry of the cone-shaped stator 220 coincides with the axis of symmetry X of the valve 120 (and thus of the stator 220). At least one, preferably a plurality (three, in the exemplary embodiment at issue) of, e.g. generically triangular, openings 230 are formed in the wall of the frusto-conical portion 220a of the stator 220, each one extending between the cone tip down to the cylindrical portion 220b. The openings 230 define corresponding passages for allowing the granules of thermoplastic material released by the octabin to flow into the extruder load hopper when the valve 120 is brought into the opened configuration, whereas the walls of the frusto-conical portion 220a between adjacent openings 230 define corresponding discharge slide surfaces 235, each one leading to a corresponding discharge window 240 formed in the lower portion of the valve body outer casing 215. As will be better specified in the following, the slide surfaces 235 and the discharge windows 240 allows contaminating particles or even granules of raw material possibly falling from the octabin, but not falling into the load hopper because the valve device 120 is closed, to be thrown outside the valve body outer casing 215.

Figures 4A, 4B:
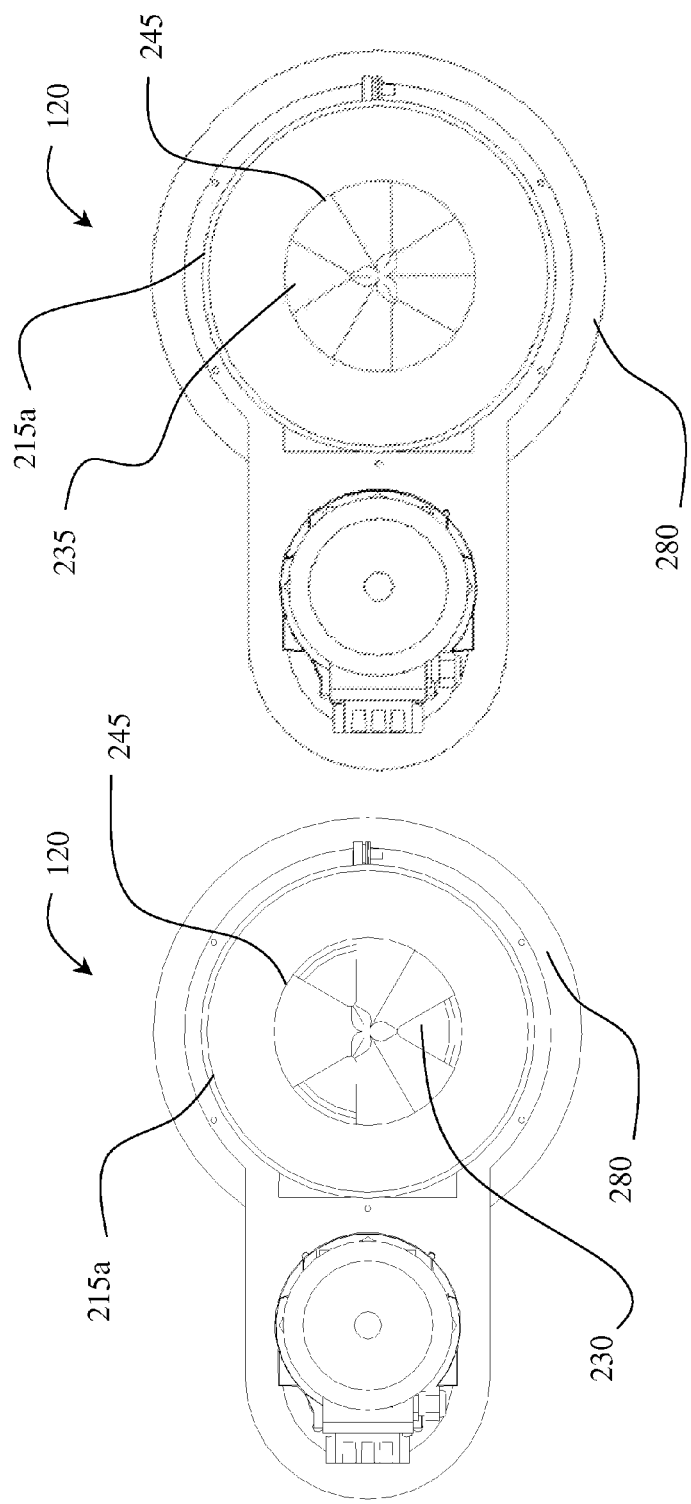

The rotor 225, which is positioned above, in sliding contact with the frusto-conical portion 220a of the stator 220, has at least one, preferably a plurality (three, in the exemplary embodiment at issue) of cover elements or blades 245, each one extending substantially radial outward from the axis X to the inner walls of the valve body outer casing 215. The blades 245 of the rotor 225 have preferably a shape matching the shape of the openings 230, for example a substantially triangular shape in orthogonal projection with respect to a plane perpendicular to the axis X. The blades 245 are spaced apart from one another of an angle corresponding to the angle between adjacent openings 230. In this way, each blade 245 is able to act as a cover element for the openings 230 or for the slide surfaces 235, by covering and closing from above a corresponding one of the openings 230 of the frusto-conical portion 220a of the stator 220 when the valve device 120 is brought into the closed configuration (also visible in the top view of FIG. 4B)—thereby preventing contaminants from entering into the load hopper (and hence reaching the extruder) through the passages defined by the openings 230 of the frusto-conical portion 220a of the stator 220—and leaving completely free and uncovered (by substantially completely hiding the discharge sliding walls 235 of the frusto-conical portion 220a of the stator 220) the openings 230 when the valve device 120 is brought into the opened condition (also visible in the top view of FIG. 4A)—thereby allowing granules of thermoplastic material falling from the octabin to reach the extruder load hopper through said passages.

Preferably, the blades 245 are shaped as wedges, with a median apex or ridge at which two downwardly inclined walls converge. This shape promotes the fall of the granules into the openings 230 of the frusto-conical portion 220a of the stator 220 (when the valve is opened), and to the discharge sliding walls 235 (when the valve is closed).

Moreover, the rotor 225 is shaped in such away that the blades 245 are able to completely cover and thus close the discharge windows 240 formed in the valve body outer casing 215 when the valve is open, and to completely free the discharge windows 240 when the valve is closed.

In this way, when the valve is closed, contaminants falling or depositing onto the frusto-conical portion 220a of the stator 220 (i.e., the discharge sliding walls 235 thereof, not covered by the wedge-shaped elements 245 of the rotor 225) are caused to slide by gravity outside the valve body outer casing 215 through the discharge sliding walls 235 and the discharge windows 240, whereas contaminants reaching the rotor 225 (i.e., the wedge-shaped elements 245 thereof), are caused, still by gravity, to laterally slide (thanks to wedge shape of the blades 245) towards the discharge sliding walls 235 of the rotor 225, and hence again to the outside of the valve body outer casing 215 through the discharge windows 240. In this way, the valve device 120 according to the described embodiment, not only prevents contaminants from entering the load hopper when the valve is closed, but also allows discharging the contaminants outside the valve body 205, thereby preventing dangerous build-up of contaminants within the valve device 120 (which might fall into the extruder load hopper, and hence into the extruder, once the valve device 120 is driven from its closed configuration to its opened configuration).

The base 210 of the valve 120 includes a cogwheel 250 driven in rotation by a motor 255, e.g. an electric step-by-step motor; in particular, the motor shaft terminates with a pinion 260 which engages the cogwheel 250 to cause the rotation thereof.

The rotor 225 is coupled to the cogwheel 250 so as to result integral thereto, thereby it rotates together with the cogwheel. The rotor 225 is rotatably coupled to the base 210 of the valve device 120 by means of ball bearings 270.

As visible in FIG. 3, a base casing 275 can be conveniently provided for covering the base 210 of the valve device 120; in an embodiment not disclosed of the present invention, such base casing 275 may be provided with a side opening through which compressed air may be blown. In this way, the blown air, going up to the openings 230 through the base 210, allows sweeping away contaminants having such a light weight, like common dust, that could not be completely discharged through the discharge sliding walls 235 and the discharge windows 240 and accumulates on and within the valve body 205. In this way, a further improved cleanliness of the valve device 120 is ensured, thus involving a high level of raw material cleanliness.

Preferably, although not necessarily, the valve body 205 (and specifically the valve body outer casing 215) may be surrounded by a removable cylindrical cover 280—for example, made of transparent plastic material—having a diameter corresponding to the diameter of the flanges 215a and 215b. The cover 280, when in operative position (visible in FIG. 2A and in FIG. 2B), rests on the lower flange 215b of the outer casing 215; in this position, contaminants coming out from the discharge windows 240 accumulates on the lower flange 215b in the gap which is formed between the outer casing cylindrical wall and the internal wall of the cover 280, and are prevented from overflowing to the outside. The accumulated contaminants may be removed by lifting the cover 280; for facilitating the lift up of the cover 280, the latter may be provided with handles (not shown).

Thanks to the present solution of valve device, it is possible to provide an improved dispensing apparatus for effectively feeding granules of thermoplastic material for high voltage cable manufacturing having high cleanliness, i.e., free from contaminating particles or waste materials coming from the surrounding environment. In fact, the valve device according to the described embodiments not only prevents waste materials from entering therein, but also performs a sort of self-cleaning by ejecting possible contaminating particles outside the valve body in the closed configuration of the valve device; in this way, when the valve device is switched from the closed configuration to the opened configuration for starting and a new extruder feeding cycle, the granules of thermoplastic material flow through the valve device without that any residual waste material therein and/or thereon mixes to the granules. This involves a high cleanliness of the granules of raw materials, which makes the cable insulator (and hence the whole high voltage cable) very stable in terms of electrical and mechanical performance, thus resulting in an improved reliability and lifetime of the high voltage cable itself. Moreover, the chosen shapes for the stator and the rotor allow a great reciprocal synergic operation making possible an effective sliding of the contaminating particles towards the external of the valve body, so that the need of frequent cleaning of the valve device (and especially of the stator and of the rotor) is substantially avoided.

Naturally, in order to satisfy local and specific requirements, a person skilled in the art may apply to the solution described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details (such as the numeric examples) set forth in the preceding description for providing a more thorough understanding thereof on the contrary, well known features may have been omitted or simplified in order not to obscure the description with unnecessary particulars. Moreover, it is expressly intended that specific elements and/or method steps described in connection with any disclosed embodiment of the invention may be incorporated in any other embodiment as a matter of general design choice.

For example, similar considerations apply if the valve device has a different structure or include equivalent components (either separated to each other or combined together, in whole or in part). In particular, some components may be omitted since not necessary for the specific required applications; for example, the plastic cover may also not be provided, since not necessary. Moreover, it is possible to provide that the stator and the rotor of the valve device implement different configurations between the opened configuration and the closed configuration. For example, in application requiring a given rate of the raw material flux flowing into the extruder, the valve device may implement a semi-opened configuration allowing only a predetermined amount of raw material in a prefixed time.

Moreover, although in the present description reference has been made to raw materials in the form of granules of thermoplastic material for high voltage cable covering manufacturing, it should be understood that it has not to be construed in a limiting way; in particular, the raw material may include a set or a subset of the following materials: polypropilene, PVC (Poly venyle chloride), high density polythene, low density polythene, nylon, polystyrene, and/or a combination thereof. Therefore, the present invention can be conveniently used in other industrial applications, even different from that of the high voltage cable manufacturing.

The stator and the rotor may have any size and/or shape, as well as for the corresponding openings and discharge sliding walls of the frusto-conical portion of the stator, and the blades of the rotor. For example, the rotor may be curved surfaces cone-shaped in order to further facilitate the sliding of the contaminating particles thereon. The same consideration apply for the discharge windows of the valve body outer casing, which discharge windows may be provided in any number, shape and/or size, according to particular and specific requirements by the manufacturer, for example for meeting logistic needs, or by the user, for example for meeting economic current assets.

The rotation of the rotor may be achieved in a different way. In particular, the motor is not limiting for the present invention, since it can be properly chosen on the basis of design and/or economic considerations. For example, it is possible to use brushless or stepper motors, depending on the desired obtainable performance; the latter, for example, ensure good performance in spite of relatively reduced costs, as well as a high mechanical and electric robustness. Significant parameters that may point the choice on a particular type of motor are the possibility of having even relatively low rotation speeds (with or without the use of mechanical adaptors), stability in the position (lack of oscillations), and simple (or absent) initial calibration. Moreover, the motor and the pinion, o even all the motor-pinion-crown assembly may be replaced by one or more equivalent components, such as for example an electro-mechanical device activated by solenoid. Additionally or alternatively, the motor may be controlled by an operator through a motor controller for "manually" controlling the opening and closing operations of the valve device during the cycle of operations of the manufacturing process, or may be programmed in such a way to automatically perform the opening and closing operations over the whole production cycle without human intervention.

Furthermore, similar considerations apply if the feeding apparatus has a different structure or includes equivalent components (either separated to each other or combined together, in whole or in part); in particular, it is possible to provide that the feeding apparatus includes more than one octabins selectively coupleable to the valve device through suitable mechanical and/or electronic selection means; for example, each octabin can store and transport a corresponding raw material, so that it is possible to create mixture of raw materials to be fed to the extruder. Additionally or alternatively, the feeding apparatus may include a plurality of such valve devices, and/or a plurality of extruders, for example in applications requiring a high capacity of performing operations in very quick succession.

The invention claimed is:

1. A valve device capable of being used in a feeding apparatus for releasing raw material into raw material processing machinery for the manufacture of high-voltage cable, comprising:
a valve body comprising a first valve member having a conical shape and comprising at least one opening extending between a tip of the first valve member and a corresponding base portion of the first valve member, and a second valve member comprising at least one cover element, one of said valve members being rotatable with respect to the other valve member between a first operating position in which the at least one cover element uncovers the at least one opening, thereby allowing the raw material to flow through the valve device, and a second operating position in which the at least one cover element covers the at least one opening, thereby preventing raw material from flowing through the valve device, wherein at least one wall of the first valve member not opened by the at least one opening defines a corresponding discharge sliding wall for conducting contaminants outside the valve body in the second operating position of the second valve member, wherein the valve body further comprises a valve body outer case laterally surrounding the first and second valve members, said valve body outer case comprising at least one discharging window coupled to the corresponding discharge sliding wall for discharging the contaminants from the discharge sliding wall outside the valve body of the valve device, and wherein the at least one cover element of the second valve member is a wedge-shaped element configured such as to cause, in the second operating position of the second valve member, contaminants falling thereon to slide toward the corresponding discharge sliding wall.

2. The valve device according to claim 1, wherein the second valve member is rotatable with respect to the first valve member about a vertical rotation axis substantially corresponding to an axis of symmetry of the valve device.

3. The valve device according to claim 1, wherein the at least one cover element of the second valve member is configured such as to cause, in the second operating position of the second valve member, contaminants falling thereon to slide outside the valve body through the at least one discharging window, and such as to cover, in the first operating position of the second valve member, a corresponding one of the at least one discharge window of the valve body outer case.

4. The valve device according claim 1, wherein the valve device comprises a cogwheel coupled to the second valve member capable of causing rotation thereof, the rotation of the cogwheel being caused by a motor apparatus comprising a pinion engaging the cogwheel.

5. A feeding apparatus capable of releasing raw material into raw material processing machinery for a high voltage cable manufacturing process, comprising a load hopper for feeding raw material coming from a raw material bin into the raw material processing machinery, comprising:
at least one valve device according to claim 1.

6. An extrusion apparatus comprising an extruder capable of extruding raw material around a high-voltage cable core and an extruder feeding apparatus capable of feeding the raw material to be extruded from a raw material bin into the extruder through an extruder load hopper, comprising:
at least one valve device according to claim 1, the at least one valve device being positioned between a raw material bin and an extruder load hopper.

7. A valve device capable of being used in a feeding apparatus for releasing raw material into raw material processing machinery for the manufacture of high-voltage cable, comprising:
a valve body comprising a first valve member having a conical shape and comprising at least one opening extending between a tip of the first valve member and a corresponding base portion of the first valve member, and a second valve member comprising at least one cover element, one of said valve members being rotatable with respect to the other valve member between a first operating position in which the at least one cover element uncovers the at least one opening, thereby allowing the raw material to flow through the valve device, and a second operating position in which the at least one cover element covers the at least one opening, thereby preventing raw material from flowing through the valve device, wherein at least one wall of the first valve member not opened by the at least one opening defines a corresponding discharge sliding wall for conducting contaminants outside the valve body in the second operating position of the second valve member, wherein the valve body further comprises a valve body outer case laterally surrounding the first and second valve members, said valve body outer case comprising at least one discharging window coupled to the corresponding discharge sliding wall for discharging the contaminants from the discharge sliding wall outside the valve body of the valve device, wherein the valve body outer case has a substantially cylindrical shape comprising a top flange and a bottom flange, the bottom flange being adapted to receive thereon the contaminants from the at last one discharge window.

8. The valve device according to claim 7, further comprising a hollow cylindrical cover for enclosing at least the bottom flange in order to prevent contaminants coming out from the at least discharge window or deposited along the bottom flange from dispersing into a surrounding environment, said cover being vertically movable from a rest position resting on the bottom flange to a vertical lifted-up position allowing access to the bottom flange for cleaning operation thereof.

9. The valve device according to claim 7, further comprising a connecting conduit connectable between a bin capable of releasing raw material and the top flange of the valve body outer case, said connecting conduit capable of allowing release of the raw material by the bin without substantial raw material losses.

* * * * *